April 13, 1954     J. K. BRIXIUS ET AL     2,675,091
SUPPORT FOR CHARGING ELECTRODES FOR ELECTROSTATIC FILTERS
Filed Aug. 10, 1951
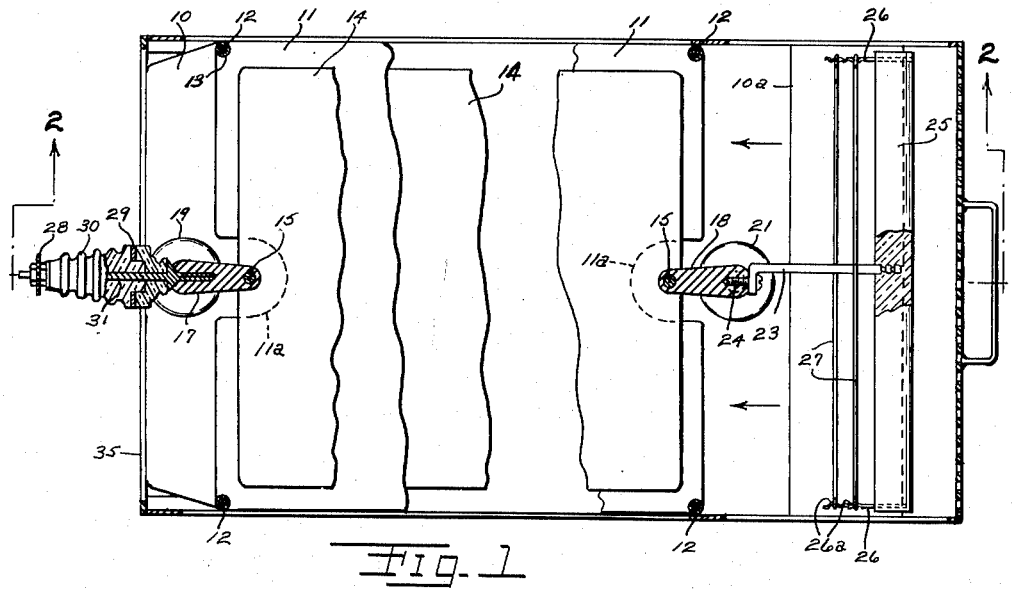
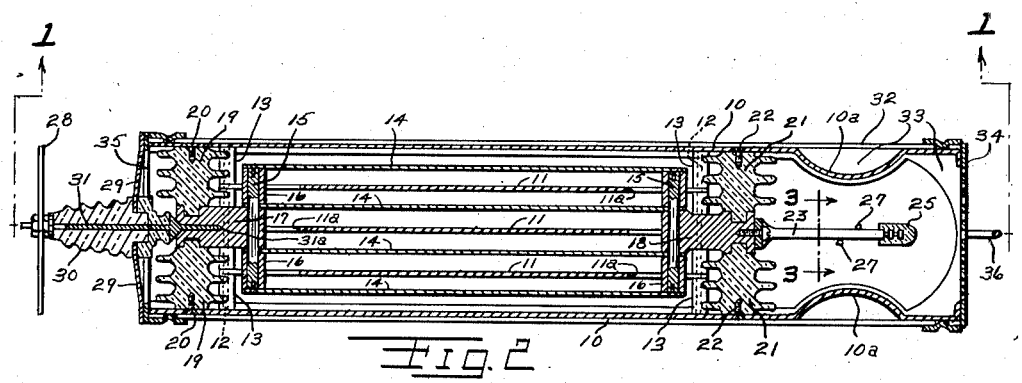
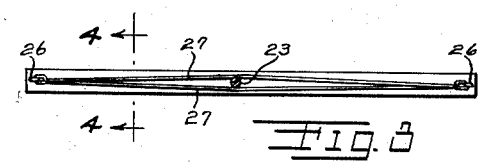
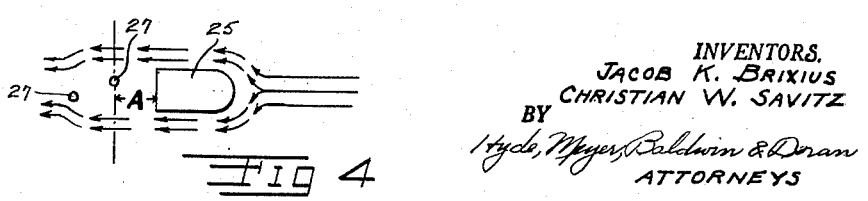
INVENTORS.
JACOB K. BRIXIUS
CHRISTIAN W. SAVITZ
BY
Hyde, Meyer, Baldwin & Doran
ATTORNEYS

Patented Apr. 13, 1954

2,675,091

UNITED STATES PATENT OFFICE 2,675,091

SUPPORT FOR CHARGING ELECTRODES FOR ELECTROSTATIC FILTERS

Jacob K. Brixius, Cleveland, and Christian W. Savitz, South Euclid, Ohio, assignors to Air-Maze Corporation, Cleveland, Ohio, a corporation of Delaware Application August 10, 1951, Serial No. 241,305

6 Claims. (Cl. 183—7)

This invention relates to improvements in a support for charging electrodes for electrostatic filters.

One of the objects of the present invention is to improve an electrostatic filter cell having collector plates charged with electricity of opposite sign and having upstream therefrom a fine wire charging electrode, the improvement consisting of a bar of nonconducting material supported in said cell upstream from the charging electrode and closely parallel thereto whereby the bar minimizes the collection of stream borne particles on said charging electrode.

Another object of the present invention is to support a bar of the character mentioned in the preceding paragraph solely by means of a rod extending upstream from the collector plates.

Still another object of the present invention is to support one or more fine wire charging electrodes from the bar mentioned in the next two preceding paragraphs, to form the bar supporting rod of electrical conducting material electrically connected with at least one of said charged collector plates, and to frictionally engage the charging electrode or electrodes with said rod so as to carry the charge from the collector plate to the electrode.

Other objects and advantages of our invention will be apparent from the accompanying drawings and description and the essential features thereof will be set forth in the appended claims.

In the drawings,

Fig. 1 is a central sectional view taken along the line 1—1 of Fig. 2 showing a filter cell embodying our invention;

Fig. 2 is a transverse sectional view of the same taken along the line 2—2 of Fig. 1;

Fig. 3 is a fragmental sectional view taken along the line 3—3 of Fig. 2; while

Fig. 4 is an enlarged sectional view taken along the line 4—4 of Fig. 3.

While our invention might be incorporated in a number of electrostatic filter cells, we have chosen to show the same as embodied in a cell of the type described and claimed in the copending application of Christian W. Savitz, Serial No. 64,642, filed December 10, 1948, now Patent 2,639,781 dated May 26, 1953, for an "Electrostatic Filter," to which reference may be had for details omitted here.

Reference may be had to our copending application Serial No. 241,306, filed August 10, 1951, for another arrangement for supporting and charging fine wire electrodes upstream from a set of collector plates.

The electrostatic cell shown in Figs. 1 and 2 is like that shown and described in the above mentioned copending application of Savitz in that it provides a set of grounded collector plates comprising a pair of outside plates 10 and a set of inside plates 11. These plates are held together by four bolts 12 which extend through cylindrical spacers 13. The side plates 10 have upstream portions 10a bent inwardly to provide grounded electrodes opposite the fine wire charging electrodes as will presently appear. Another set of charged collector plates 14 are positioned alternately between and parallel to the grounded plates 10 and 11. The plates 14 are shorter and narrower than the plates 11 as clearly shown in Fig. 1. The plates 14 are electrically connected and supported along their horizontal center line by means of bolts 15. Spacers 16 hold the plates 14 in proper position. Each bolt 15 is supported respectively by an insulated bracket 17 at the rear end and 18 at the front end. The bracket 17 is supported by insulators 19 which are rigidly secured to the plates 10 by the screws 20. The bracket 18 is rigidly supported by the insulators 21 which in turn are rigidly secured to the side plates 10 by means of screws 22. The plates 11 are cut away as indicated at 11a so as to give a proper air gap between these grounded plates and the charged bolts 15 and spacers 16.

The means for supporting the charging electrodes upstream from the collector plates will now be described. A rod 23 of electrically conducting material is rigidly mounted on the electrically conducting bracket 18 by means of a screw 24 with the axis of the rod parallel to the general direction of air flow through the cell as indicated by the arrows in Fig. 1. On the upstream end of the rod 23 there is rigidly mounted, as by molding, a bar 25 of electrically nonconducting material such as a synthetic molded plastic. This bar 25 extends substantially at right angles to the direction of stream flow for the full heighth of the cell or, in other words, substantially the full width of the plates 11. Molded rigidly into the top and bottom ends of the bar 25 are rigid wire brackets 26 extending downstream. One or more fine wire charging electrodes are supported taut between the brackets 26. Preferably, for reasons stated in the above mentioned copending application of Savitz, two of these fine wire charging electrodes are provided. The brackets 26 may be notched as indicated at 26a in order to properly position the two electrodes 27 parallel to each other and parallel to the bar 25. As clearly shown in Figs. 2 and 3, the rod 23 is frictionally engaged between the fine wire electrodes 27 in a manner which is sufficient to transmit an electrical charge from rod 23 to the wires 27.

The manner of charging the cell will now be described. As clearly described in the above mentioned copending application of Savitz, a suitable power pack provides high voltage substantially unidirectional current to a bus bar 28.

Rigidly supported from the cell frame by brackets 29, is an insulator 30. Passing axially of this insulator is a conductor 31 electrically connected at one end with the bus bar 28 and terminating inwardly in a conducting prong 31a. The cell is slidable horizontally in a frame comprised of the side members 32, top and bottom plates 33, and frame members 35 at the downstream end. The upstream end of the cell has a perforated plate 34 rigidly connecting side plates 10. A handle 36 is attached rigidly to plate 34 for manipulation of the cell. As the cell slides into the position shown in Figs. 1 and 2, the electrically conducting bracket 17 has a recess which receives tightly the prong 31a so that the high voltage unidirectional current is transmitted from the bus bar 28 through conductor 31, bracket 17 and bolts 15 and spacers 16 to the plates 14. At the forward end of the plates 14 they are electrically connected to the member 18 which in turn conducts electricity to the member 23 and thus to the charging electrodes 27.

Referring to Fig. 4, it will be noted that the bar 25 is laterally wider than the diameter of one of the wire electrodes 27, and indeed, when the wires 27 are spaced on opposite sides of rod 23, the bar 25 is wider than the lateral width of rod 23 plus the diameter of two wires 27 on opposite sides thereof. Thus, when the flow of the dirty gaseous stream is in the direction of the arrows shown in Fig. 4, the bar 25 protects the fine wire electrodes 27 so that dirty particles in the gaseous stream do not collect thereon to any degree. The bar 25 is upstream from the nearer wire electrode 27 one inch or less. In a preferred form of my invention, this distance A as shown in Fig. 4 is approximately one-half to five-eighths inch.

What we claim is:

1. In an electrostatic filter cell having collector plates charged with electricity of opposite sign and having upstream therefrom a fine wire charging electrode, a bar of nonconducting material supported in said cell upstream from said charging electrode and closely parallel thereto, said bar supporting said electrode and said bar being substantially wider than said electrode whereby to minimize the collection of stream borne particles on said electrode.

2. In an electrostatic filter cell having a set of electrically charged collector plates alternately positioned between a set of grounded collector plates, said plates terminating in upstream edges generally normal to the direction of flow through said cell of a gaseous stream to be filtered, a rod of electrically conducting material rigidly supported from said set of charged collector plates and extending upstream therefrom generally parallel to the direction of said stream flow, a bar of nonconducting material rigidly mounted on said rod spaced from and generally parallel to said upstream plate edges, means supporting a fine wire charging electrode taut between opposite ends of said bar parallel to said bar on the downstream side thereof, and said wire electrode frictionally engaging said rod so as to charge said electrode.

3. In an electrostatic filter cell having collector plates charged with electricity of opposite sign and having upstream therefrom a fine wire charging electrode, a bar of nonconducting material supported in said cell upstream from said charging electrode and closely parallel thereto, and said bar being substantially wider than said electrode whereby to minimize the collection of stream borne particles on said electrode, a rod connected between said plates and said bar and forming the sole support for said bar.

4. In an electrostatic filter cell having collector plates charged with electricity of opposite sign and having upstream therefrom a fine wire charging electrode, a bar of nonconducting material supported in said cell upstream from said charging electrode and closely parallel thereto, and said bar being substantially wider than said electrode whereby to minimize the collection of stream borne particles on said electrode, a rod connected between said plates and said bar and forming the sole support for said bar, said rod being of electrical conducting material electrically connected with at least one of said collector plates, and said rod frictionally engaging said electrode whereby to carry the charge from said one plate to said electrode.

5. In an electrostatic filter cell having a set of electrically charged collector plates alternately positioned between a set of grounded collector plates, said plates terminating in upstream edges generally normal to the direction of flow through said cell of a gaseous stream to be filtered, a rod of electrically conducting material rigidly supported from said set of charged collector plates and extending upstream therefrom generally parallel to the direction of said stream flow, a bar of nonconducting material rigidly mounted on said rod spaced from and generally parallel to said upstream plate edges, means supporting a fine wire charging electrode taut between opposite ends of said bar parallel to said bar on the downstream side thereof, and said wire electrode frictionally engaging said rod so as to charge said electrode, said rod being positioned centrally of said upstream plate edges, there being two of said fine wire electrodes supported from said bar on the downstream side thereof and parallel to said bar, and said wires frictionally engaging said rod on opposite sides of the latter.

6. In an electrostatic filter cell having a set of electrically charged collector plates alternately positioned between a set of grounded collector plates, said plates terminating in upstream edges generally normal to the direction of flow through said cell of a gaseous stream to be filtered, a rod of electrically conducting material rigidly supported from said set of charged collector plates and extending upstream therefrom generally parallel to the direction of said stream flow, a bar of nonconducting material rigidly mounted on said rod spaced from and generally parallel to said upstream plate edges, means supporting a fine wire charging electrode taut between opposite ends of said bar parallel to said bar on the downstream side thereof, and said wire electrode frictionally engaging said rod so as to charge said electrode, said rod being positioned centrally of said upstream plate edges, there being two of said fine wire electrodes supported from said bar on the downstream side thereof and parallel to said bar, said wires frictionally engaging said rod on opposite sides of the latter, and said bar being wider than the lateral width of said rod plus the diameters of said two wire electrodes, whereby to minimize the collection of stream borne particles on said electrodes.

References Cited in the file of this patent

UNITED STATES PATENTS

| Number | Name | Date |
|---|---|---|
| 2,086,063 | Brion et al. | July 6, 1937 |
| 2,255,677 | Penney | Sept. 9, 1941 |